(12) United States Patent
Fujii

(10) Patent No.: US 11,260,747 B2
(45) Date of Patent: Mar. 1, 2022

(54) TANK MOUNTING STRUCTURE AND VEHICLE

(71) Applicant: TOYOTA JIDOSHA KABUSHIKI KAISHA, Toyota (JP)

(72) Inventor: Manabu Fujii, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 505 days.

(21) Appl. No.: 16/160,039

(22) Filed: Oct. 15, 2018

(65) Prior Publication Data

US 2019/0160941 A1    May 30, 2019

(30) Foreign Application Priority Data

Nov. 29, 2017   (JP) .............................. JP2017-228838

(51) Int. Cl.
*B60K 15/07* (2006.01)
*F17C 13/08* (2006.01)
(Continued)

(52) U.S. Cl.
CPC ........ *B60K 15/07* (2013.01); *B60K 15/03006* (2013.01); *B60K 15/03177* (2013.01); *F17C 13/084* (2013.01); *B60K 2015/03046* (2013.01); *B60K 2015/03315* (2013.01); *B60K 2015/0675* (2013.01); *B60Y 2306/01* (2013.01); *F17C 2201/0109* (2013.01); *F17C 2201/035* (2013.01); *F17C 2201/05* (2013.01); *F17C 2201/056* (2013.01); *F17C 2203/0604* (2013.01); *F17C 2203/0619* (2013.01); *F17C 2205/0192* (2013.01);
(Continued)

(58) Field of Classification Search
CPC .............. B60K 15/07; B60K 15/03006; B60K 15/03177; B60K 2015/03046; B60K 2015/03315; B60K 2015/0675; F17C 13/084; F17C 2201/0109; F17C 2201/035; F17C 2201/05; F17C 2201/056; F17C 2203/0604; F17C 2203/0619; F17C 2205/0192; F17C 2205/0305; F17C 2221/012; F17C 2223/0123; F17C 2223/03; B60Y 2306/01
See application file for complete search history.

(56) References Cited

U.S. PATENT DOCUMENTS 6,557,814 B1 *   5/2003   Rutz ..................... B60K 15/07
                                                       248/503
8,366,152 B2 *   2/2013   Tsubokawa ........... B60K 15/07
                                                       280/834
(Continued)

FOREIGN PATENT DOCUMENTS

CN       101835650 A      9/2010
EP       3078532 A1      10/2016
(Continued)

*Primary Examiner* — Jacob D Knutson
(74) *Attorney, Agent, or Firm* — Dickinson Wright, PLLC

(57) ABSTRACT

A tank mounting structure includes a frame, a band, and a tank protector. The frame is configured to fix the tank. The band is configured to fix the tank in a state where the band sandwiches the tank with the frame and the band deforms in accordance with expansion or contraction of the tank. The tank protector is configured to be fixed to an inner side of the band or an outer side of the band.

8 Claims, 4 Drawing Sheets

(51) Int. Cl.
*B60K 15/03* (2006.01)
*B60K 15/067* (2006.01)

(52) U.S. Cl.
CPC  *F17C 2205/0305* (2013.01); *F17C 2221/012* (2013.01); *F17C 2223/0123* (2013.01); *F17C 2223/036* (2013.01); *F17C 2270/0178* (2013.01)

(56) References Cited

U.S. PATENT DOCUMENTS

| | | | |
|---|---|---|---|
| 2010/0045018 A1* | 2/2010 | Kondo | B60K 15/07 |
| | | | 280/834 |
| 2010/0252353 A1 | 10/2010 | Tsubokawa | |
| 2012/0213580 A1* | 8/2012 | Omori | F16B 21/078 |
| | | | 403/375 |
| 2015/0268083 A1 | 9/2015 | Ogiwara et al. | |
| 2016/0096495 A1* | 4/2016 | Sasaki | F16B 2/08 |
| | | | 248/505 |
| 2017/0240045 A1* | 8/2017 | Ohashi | B60K 15/07 |
| 2017/0299769 A1* | 10/2017 | Ohmi | G01V 11/002 |
| 2018/0003346 A1* | 1/2018 | Chung | B29C 65/48 |
| 2018/0035002 A1* | 2/2018 | Murase | H04N 1/02885 |
| 2018/0326842 A1* | 11/2018 | Sawada | B62D 21/152 |

FOREIGN PATENT DOCUMENTS

| | | | |
|---|---|---|---|
| JP | 2005119595 A | | 5/2005 |
| JP | 2009101865 A | | 5/2009 |
| JP | 2012240448 A | * | 12/2012 |
| JP | 2015182558 A | | 10/2015 |
| JP | 2016070468 A | | 5/2016 |
| KR | 10-2009-0056412 A | | 6/2009 |
| KR | 10-2016-0039540 A | | 4/2016 |
| KR | 1020160119594 A | | 10/2016 |

* cited by examiner

TANK MOUNTING STRUCTURE AND VEHICLE

INCORPORATION BY REFERENCE

The disclosure of Japanese Patent Application No. 2017-228838 filed on Nov. 29, 2017 including the specification, drawings and abstract is incorporated herein by reference in its entirety.

BACKGROUND

1. Technical Field

The disclosure relates to a tank mounting structure and a vehicle.

2. Description of Related Art

In Japanese Unexamined Patent Application Publication No. 2005-119595 (JP 2005-119595 A), a structure is disclosed in which a protector that covers a rear side of a tank body is provided in a rear axle of a vehicle in order to mitigate an impact on the tank that stores gas used for a fuel cell.

SUMMARY

Normally, a tank expands and contracts depending on an amount gas stored. Therefore, in the configuration described in JP 2005-119595 A, when the tank contracts, a gap between the tank and the protector can expand. Also, when the protector receives force from outside in a state where a foreign object such as a large stone is trapped in the expanded gap, a portion of the tank that is in contact with the trapped foreign matter receives force locally. As a result, the tank can be damaged. Therefore, a technology has been desired that prevents expansion of the gap between the tank and the protector.

It is possible to carry out the disclosure in the following aspects.

According to an aspect of the disclosure, a tank mounting structure is provided. The tank mounting structure includes a frame, a band, and a tank protector. The frame is configured to fix the tank. The band is configured to fix the tank in a state where the band sandwiches the tank with the frame and the band deforms in accordance with expansion or contraction of the tank. The tank protector is configured to be fixed to an inner side of the band or an outer side of the band. With the tank mounting structure according to the aspect, since the tank protector and the band are fixed to each other, the tank protector moves according to expansion or contraction of the tank. Thus, it is possible to restrain expansion of a gap between the tank and the tank protector.

In the tank mounting structure according to the aspect, the tank protector includes a center member and end portion members. The center member is provided on an outer side of a cylinder portion that is a cylindrical portion of the tank. The end portion members are provided on outer sides of dome portions, respectively. The dome portions are on both end sides of the cylinder portion of the tank, respectively. The end portion members may be thicker than the center member. With the tank mounting structure according to the aspect, the dome portions with relatively small strength are selectively protected by the end portion members, respectively. At the same time, by reducing the thickness of the center member so as to be thinner than the end portion members, it is possible to reduce a weight of the tank protector.

In the tank mounting structure according to the aspect, shear strength of the tank protector may be greater than shear strength of the band. Also, the mounting structure may be configured such that an end portion of the band is fixed to the frame while applying pressing force to the tank by using an elastic body. Further, the band may be made from metal. Furthermore, the band may be made from an elastic resin material. Further, lower ends of the end portion members of the tank protector may be positioned so as to be lower than a lower end of the center member of the tank protector.

It is possible to carry out the disclosure in various aspects. For example, it is possible to carry out the disclosure in an aspect such as a vehicle having the tank mounting structure.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. Embodiments

Figure 1:
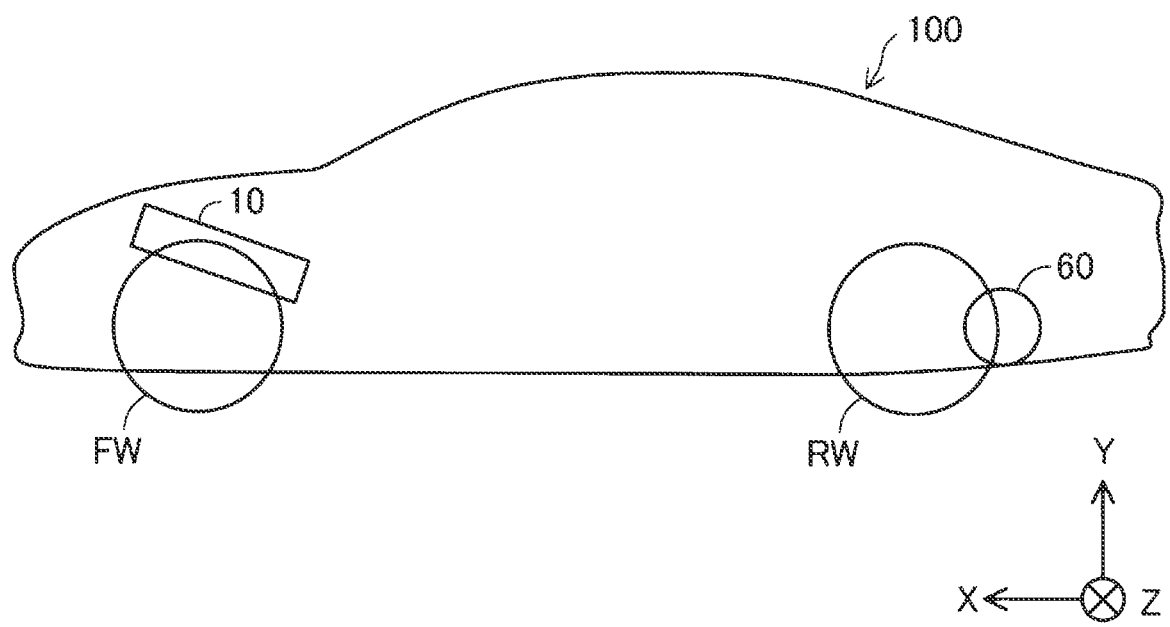
FIG. 1 is a view of a vehicle having a tank mounting structure as an embodiment of the disclosure.

FIG. 1 is a view of a vehicle 100 having a mounting structure of a tank 60 as an embodiment of the disclosure. In the embodiment, a fuel cell vehicle is used as the vehicle 100. Description regarding directions in the vehicle 100 ("right", "left", "front", "rear", "upper", and "lower") indicates directions based on a driver who is in the vehicle 100, respectively. In FIG. 1, an X axis forward direction indicates a vehicle front direction, a Y axis forward direction indicates an upper side of the gravity direction, and a Z axis forward direction indicates a vehicle right direction. This means that the X axis direction indicates a front-rear direction of the vehicle, the Y axis direction indicates the gravity direction, and the Z axis direction indicates a width direction of the vehicle. The X, Y, and Z axes are the same in the drawings after FIG. 1.

The vehicle 100 includes a fuel cell stack 10 and the tank 60. The fuel cell stack 10 is made by laminating power modules, for example, each of which has a membrane electrode assembly (MEA) in which both electrodes, an anode and a cathode, are joined to both sides of an electrolyte film, respectively. Power is generated in the fuel cell stack 10 due to an electrochemical reaction between hydrogen gas as fuel gas supplied from the tank 60, and oxygen in the atmosphere. In the embodiment, the fuel cell stack 10 is disposed in a front part of the vehicle 100 (on a +X axis direction side). Specifically, in the front-rear direction (the X axis direction) of the vehicle 100, the fuel cell stack 10 is disposed at a position where the fuel cell stack 10 partially overlaps front wheels FW.

In the embodiment, the tank 60 is disposed in the rear part of the vehicle 100 (on a −X axis direction side) along the width direction of the vehicle 100 (the Z axis direction). Specifically, in the front-rear direction (the X axis direction) of the vehicle 100, the tank 60 is disposed at a position where the tank 60 partially overlaps rear wheels RW and the remaining part of the tank 60 is at the rear of the rear wheels RW.

Figure 2:
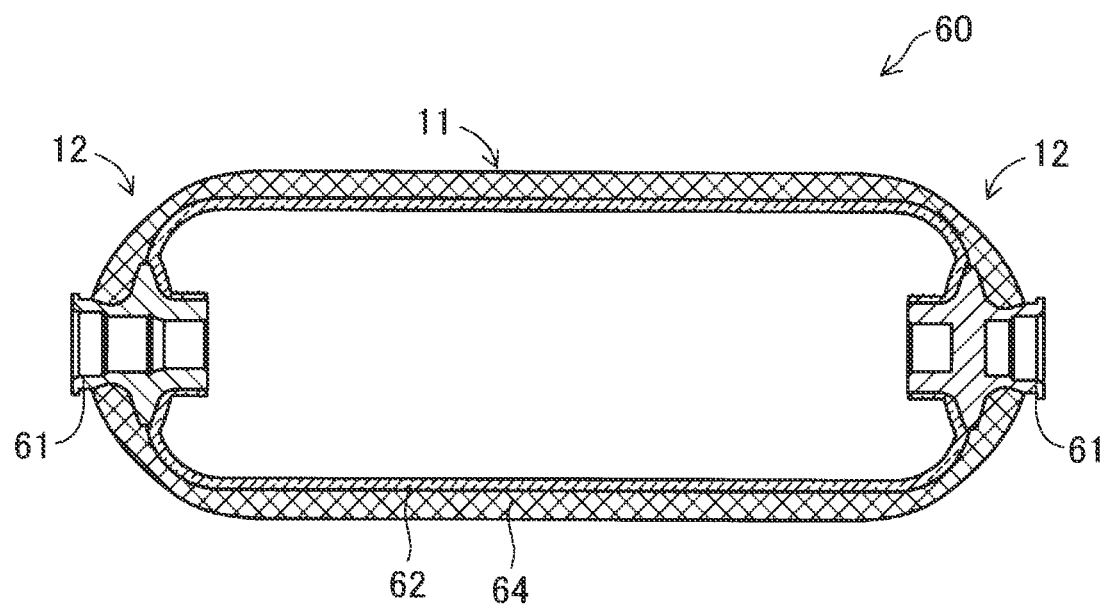
FIG. 2 is a sectional view of a tank.

FIG. 2 is a sectional view of the tank 60. In the embodiment, the tank 60 includes a liner 62 and a reinforcing layer 64.

The liner 62 of the tank 60 is an airtight container that stores fluid. As a material of the liner 62, for example, aluminum, stainless steel, and resin may be used. The liner 62 includes cap portions 61 on both end sides in the longitudinal direction, respectively. Each of the cap portions 61 plays a role as a pipe when gas is stored in the liner 62. In the embodiment, depending of a filling amount of hydrogen gas inside the tank 60, an outer diameter of the tank 60 changes by between about 1 mm and about 2 mm.

The reinforcing layer 64 of the tank 60 is a layer that is formed by winding a resin-impregnated fiber bundle around a surface of the liner 62. The reinforcing layer 64 is provided in order to improve strength of the tank 60. In the embodiment, carbon fiber is used as fiber used for the reinforcing layer 64.

In the embodiment, the tank 60 includes a cylinder portion 11 that has a cylindrical shape and is formed in a center portion, and almost hemispherical dome portions 12 provided on both end sides of the cylinder portion 11, respectively. Normally, since the reinforcing layer 64 tends to become thinner in a part of each of the dome portions 12, the cylinder portion 11 tends to have higher strength compared to the dome portions 12.

Figure 3:
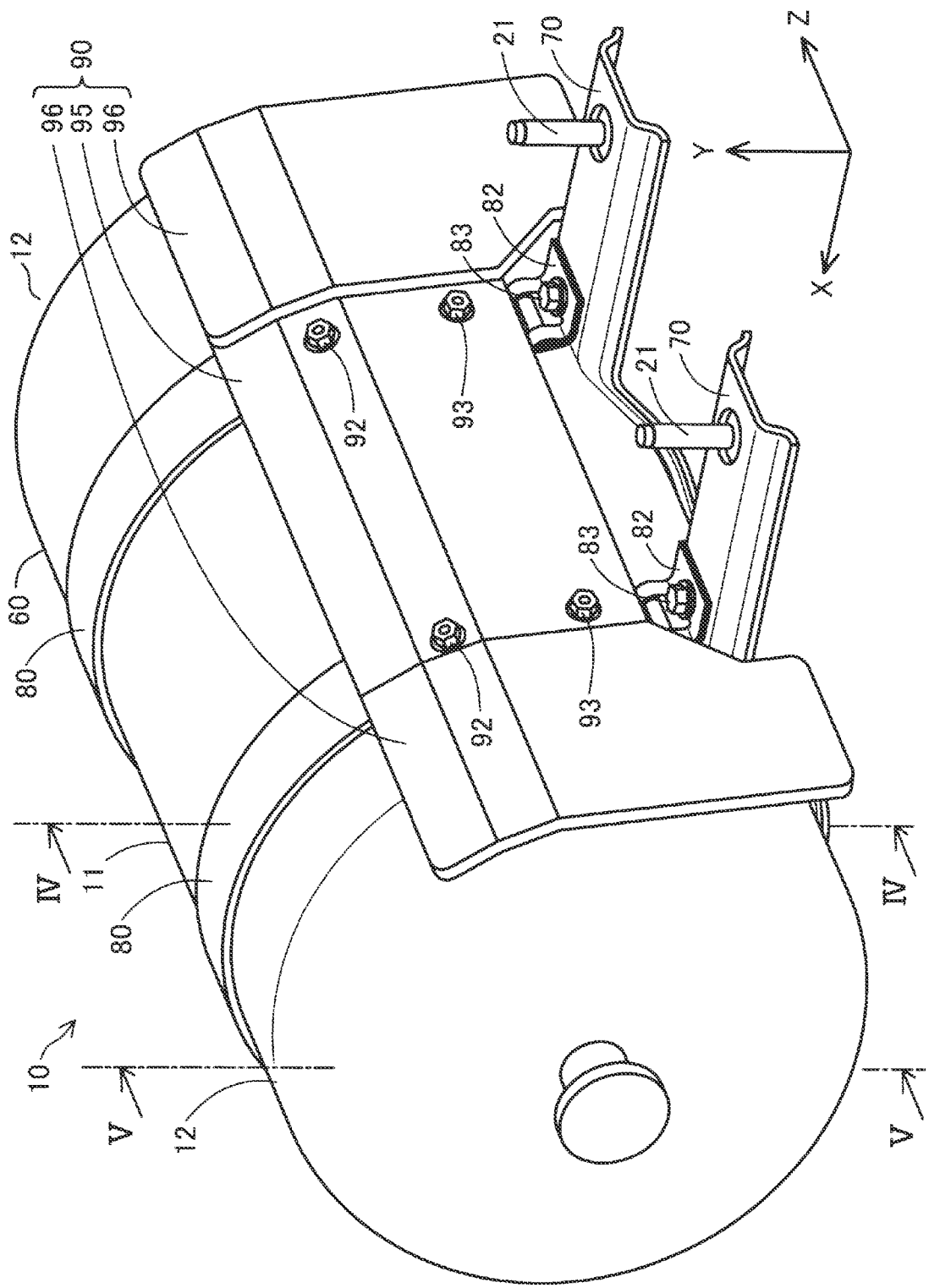
FIG. 3 is a perspective view of the tank mounting structure for the vehicle.
Figure 4:
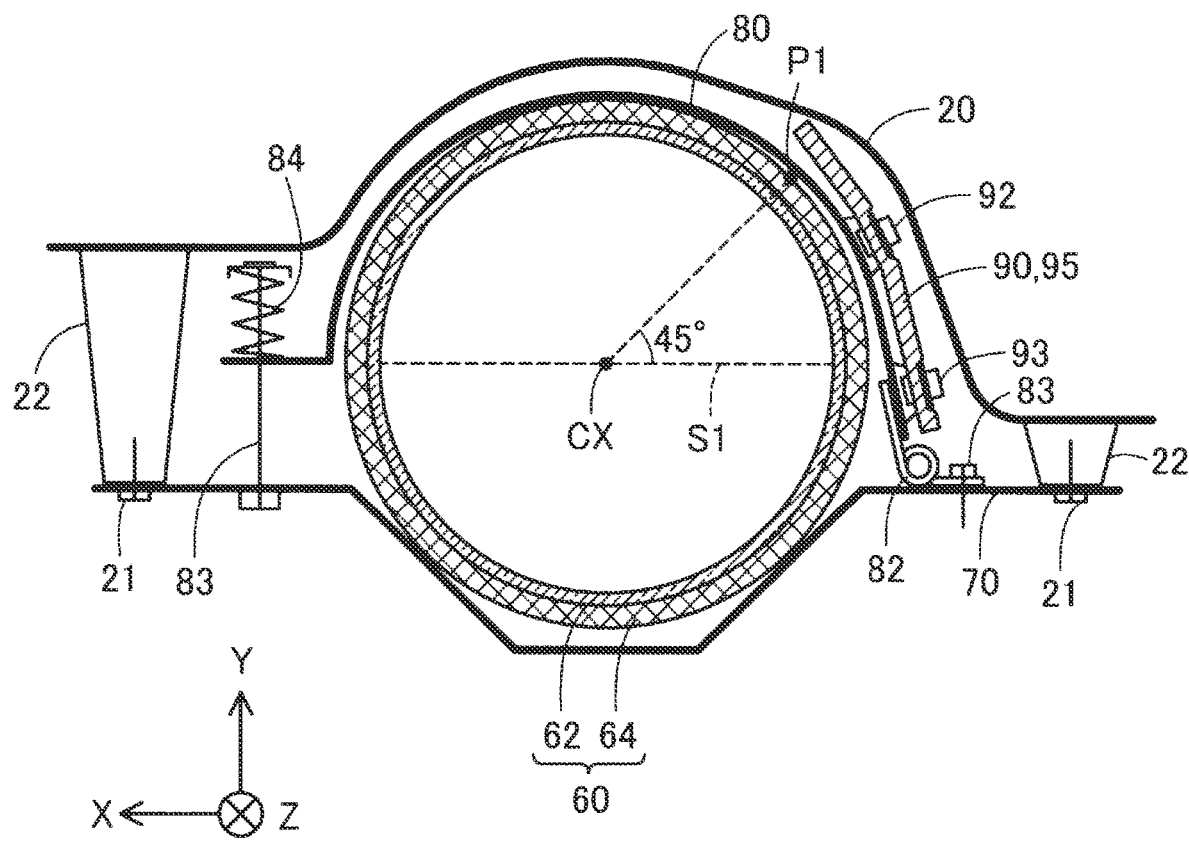
FIG. 4 is a sectional view of the tank mounting structure in a cylinder portion of the tank.
Figure 5:
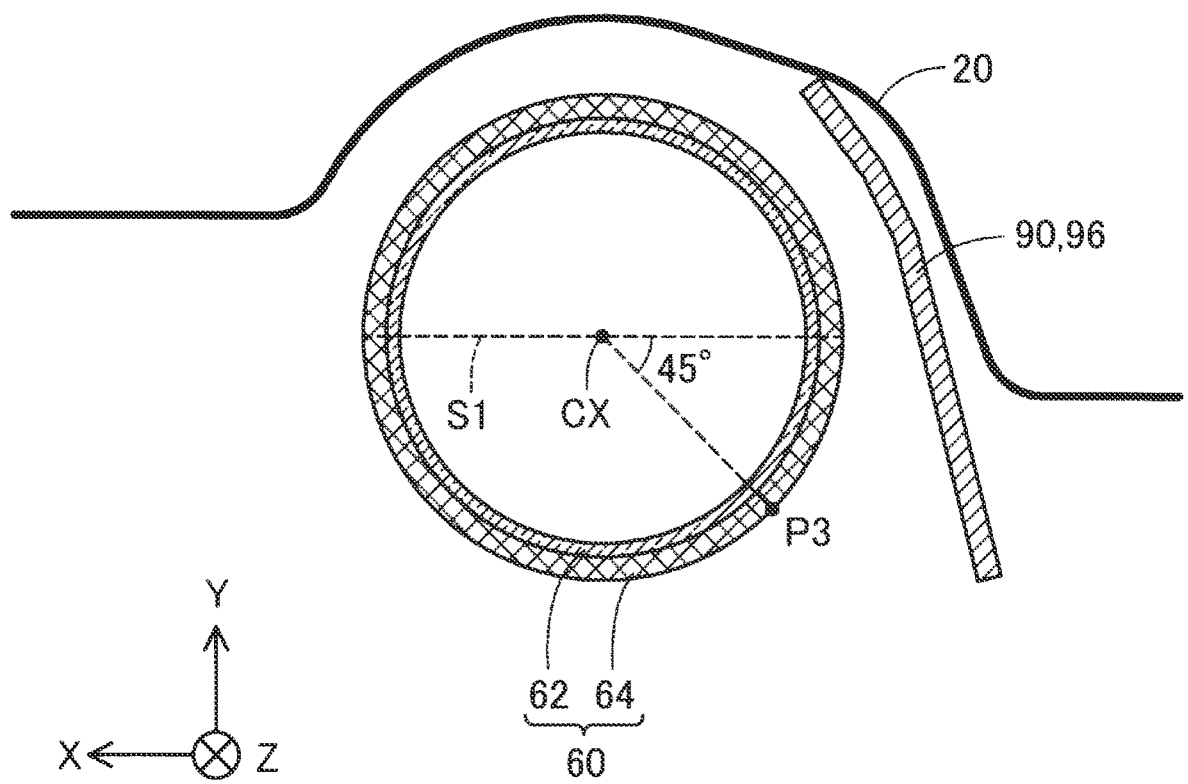
FIG. 5 is a sectional view of the tank mounting structure in a dome portion of the tank.

FIG. 3 to FIG. 5 are views of a mounting structure of the tank 60 for the vehicle 100. FIG. 3 is a perspective view of the mounting structure of the tank 60 for the vehicle 100. FIG. 4 shows a section taken along the line IV-IV in FIG. 3, and is a sectional view of the mounting structure in the cylinder portion 11 of the tank 60. FIG. 5 shows a section taken along the line V-V in FIG. 3, and is a sectional view of the mounting structure in the dome portion 12 of the tank 60. The mounting structure of the tank 60 includes frames 70, bands 80, and a tank protector 90.

The frames 70 are members used in order to fix the tank 60 (see FIG. 3). In the embodiment, the frames 70 are provided below (on a −Y axis direction side of) the tank 60 and along the front-rear direction (the X axis direction) of the vehicle 100. In the embodiment, the two frames 70 are provided in parallel to each other below the cylinder portion 11 of the tank 60.

As shown in FIG. 4, in the embodiment, both ends of each of the frames 70 in the front-rear direction (the X axis direction) are fastened to a lower surface of an underbody 20 of the vehicle 100 by brackets 22 and bolts 21, respectively. In the embodiment, a center portion of the frame 70 is bent along the shape of the tank 60 and has a shape that is depressed downwardly.

The bands 80 are members that fix the tank 60 in a state the bands 80 sandwiches the tank 60 with the frame 70 and the bands 80 deform in accordance with expansion or contraction of the tank 60 (see FIG. 3). In the embodiment, each of the bands 80 is provided on an upper side (a +Y axis direction side) of the cylinder portion 11 of the tank 60, and has a shape that extends in the front-rear direction of the vehicle 100 (the X axis direction). In the embodiment, the two bands 80 are provided in parallel to each other. In the embodiment, the bands 80 are bent along a circumference of the tank 60.

As shown in FIG. 4, in the embodiment, an end portion of each of the bands 80 on the rear side (the −X axis direction side) of the vehicle 100 is fixed to the frame 70 through a hinge 82 and a bolt 83. Further, an end portion of each of the bands 80 on the front side (the +X axis direction side) of the vehicle 100 is fixed to the frame 70 by the bolt 83 while applying pressing force to the tank 60 using a spring 84. With the structure, the bands 80 fix the tank 60 in the state where the bands 80 sandwich the tank 60 with the frames 70 and the bands 80 deform in accordance with expansion or contraction of the tank 60. In the embodiment, the bands 80 are made from metal, but may be made from other material such as carbon fiber resin, glass fiber resin, leather, canvas, and rope.

The tank protector 90 is a member that protects the tank 60 from external force. External force is applied when, for example, the vehicle 100 collides. The tank protector 90 is provided on an outer side of the tank 60, and is also fixed to outer sides of the bands 80. The tank protector 90 may be fixed to inner sides of the bands 80, or may be fixed to the inner sides of the bands 80 and the outer sides of the bands 80. In the latter case, two of the tank protectors 90 are used.

From a perspective of protecting the tank 60, in view of the vehicle 100 from the rear side (the −X axis direction side) in parallel to the X axis direction, it is preferred that a ratio of a range of the tank 60 that overlaps the tank protector 90 is at least 50% of the entire tank 60. It is more preferred when the ratio is 60%, and the ratio of 70% is even more preferred. Meanwhile, from a perspective of weight reduction of the tank protector 90, it is preferred that the ratio of the range of the tank 60 that overlaps the tank protector 90 is 90% or lower of the entire tank 60, and the ratio of 80% or lower is more preferred. In the embodiment, in view of the vehicle 100 from the rear side (the −X axis direction side) in parallel to the X axis direction, the ratio of the range of the tank 60 that overlaps the tank protector 90 is 70% or higher but not exceeding 80% of the entire tank 60.

From the perspective of protecting the tank 60 from external force, it is preferred that shear strength of the tank protector 90 is greater than that of the bands 80. In the specification, shear strength means a load required to penetrate a member using a punch with the same size. Shear strength is proportional to a thickness of a member. In the embodiment, the tank protector 90 is made from metal that is the same material as that of the band 80. Since the tank protector 90 is thicker than the band 80, shear strength of the tank protector 90 is greater than that of the band 80. The material of the tank protector 90 is not limited to metal, and may be other material such as carbon fiber resin and polycarbonate.

As shown in FIG. 4, in the embodiment, the tank protector 90 is fixed to each of the bands 80 at two locations by bolts 92, 93. A fixing method for the tank protector 90 is not limited to bolts but may be, for example, welding between the tank protector 90 and the bands 80. In the embodiment, the tank protector 90 is fixed to portions of the bands 80 that are not the end portions in the front-rear direction (the X axis direction). In the embodiment, from a viewpoint of restraining the bolt 92 provided on the upper side from coming into contact with the underbody 20, the portion of the tank protector 90 in which the bolt 92 is provided is thinner than the rest of the tank protector 90. However, the disclosure is not limited to this. For example, in the portion of the tank protector 90 in which the bolt 92 is provided may have the same thickness as that of the rest of the tank protector 90.

As shown in FIG. 3, in the embodiment, the tank protector 90 is made out of three members. Specifically, tank protector 90 includes a center member 95 disposed in the center, and two end portion members 96 provided on both end sides of the center member 95, respectively. The center member 95 is a member provided on an outer side of the cylinder portion 11 of the tank 60. The end portion members 96 are members provided on outer sides of the dome portions 12 of the tank 60, respectively. In the embodiment, the center member 95 and each of the end portion members 96 are joined to each other by welding. Further, an overlapping portion of the center member 95 and each of the end portion members 96 has a width required for welding (for example, between about 1 cm and 2 cm), and the center member 95 does not reach the both ends of the tank protector 90. By doing so, rigidity of a connecting portion between each of the end portion members 96 and the center member 95 is enhanced. Thus, it is possible to restrain flapping elastic deformation of the end portion members 96 caused by vibration of the vehicle 100 in the front-rear direction (the X axis direction). The end portion members 96 and the center member 95 may be welded to each other through their end surfaces.

In the embodiment, a thickness of each of the end portion members 96 is larger than that of the center member 95. The "thickness" means a distance between a pair of flat plates that sandwiches a flat portion of a member. Thus, the dome portions 12 having relatively low strength are protected selectively by the end portion members 96, respectively. At the same time, by reducing the thickness of the center member 95 so as to be smaller than those of the end portion members 96, the weight of the tank protector 90 is reduced. The disclosure is not limited to this, and the center member 95 may have the same thickness as those of the end portion members 96, or the center member 95 may be thicker than the end portion members 96. The tank protector 90 may be made of, for example, a single member instead of the three members.

In the embodiment, the tank protector 90 is provided on the rear side (the −X axis direction side) of the tank 60. By doing so, the tank protector 90 is able to protect the tank 60 from external force from the rear side of the vehicle 100. The disclosure is not limited to this, and the tank protector 90 may be provided on the front side (the +X axis direction side) of the tank 60. As the tank protector 90 is provided on the front side of a portion of the tank 60 where the external force can be applied, the tank protector 90 is able to protect the tank 60 efficiently.

In the embodiment, when the tank protector 90 is seen in the width direction of the vehicle 100 (the Z axis direction), the tank protector 90 is bent along the surface of the tank 60. Thus, the tank protector 90 is restrained from being bent in the width direction (the Z axis direction).

Also, as shown in FIG. 3, in the embodiment, an upper end (an end on the +Y axis direction side) of the center member 95 of the tank protector 90 is at the same height as an upper end of each of the end portion members 96. As shown in FIG. 4, the upper end of the tank protector 90 is located above a surface P1 of the tank 60. The surface P1 is located above a horizontal plane S1 at an angle of 45° from a central axis CX. The horizontal plane S1 passes the central axis CX of the tank 60. Thus, even when the tank 60 receives external force from the rear side (the −X axis direction side) to the front side (the +X axis direction side) of the vehicle 100 above the tank protector 90, over a half of the external force is warded off along the surface of the tank 60.

Further, as shown in FIG. 3, in the embodiment, a lower end of each of the end portion members 96 of the tank protector 90 is positioned so as to be lower than a lower end of the center member 95 of the tank protector 90. Thus, it is possible to enhance protection of the dome portions 12 that have less strength than the cylinder portion 11 in the tank 60.

As shown in FIG. 5, in the embodiment, the lower end of each of the end portion members 96 of the tank protector 90 is located below a surface P3 of the tank. The surface P3 is located below the horizontal plane S1 at an angle of 45° from the central axis CX. The horizontal plane S1 passes the central axis CX of the tank 60. Thus, even when the tank 60 receives external force from the rear side (the −X axis direction side) to the front side (the +X axis direction side) of the vehicle 100 below the tank protector 90, over a half of the external force is warded off along the surface of the tank 60.

As described above, in the mounting structure of the tank 60 according to the embodiment, the tank protector 90 is fixed to the bands 80. Therefore, when there is variation in size of the tank 60, or the tank 60 contracts, the bands 80 and the tank protector 90 synchronize with the tank 60, and it is thus possible to restrain expansion of the gap between the tank 60 and the tank protector 90. As a result, the gap is kept minimized, and it is thus possible to restrain a foreign object such as a large stone from trapped in the gap. In particular, in a case of a movable body such as a vehicle, a foreign object such as a large stone can enter the movable body while it is moving. However, with the mounting structure for the tank 60 according to the embodiment, it is possible to restrain such a foreign matter from being trapped in the gap between the tank 60 and the tank protector 90. Further, as a result of restraining expansion of the gap between the tank 60 and the tank protector 90, noise that can be generated by the gap is addressed easily.

B. Other Embodiments

In the foregoing embodiment, the frames 70 are provided on the lower side (the −X axis direction side) of the tank 60, and the bands 80 are provided on the upper side (the +X axis direction side) of the tank 60. However, the disclosure is not limited to this. For example, the frames 70 may be provided on the upper side (the +X axis direction side) of the tank 60, and the bands 80 may be provided on the lower side (the −X axis direction side) of the tank 60.

In the foregoing embodiment, as the mounting structure of the tank 60, the vehicle 100 on which the tank 60 is mounted is described as an example. However, the disclosure is not limited to this. For example, the disclosure may be used in a movable body other than a vehicle, the movable body using the mounting structure of the tank 60 according to the embodiment. Further, the mounting structure of the tank 60 may be used in a fixed device. By providing the tank protector 90 on the outer side of a portion of the tank 60 where an impact is likely to be applied from outside, it is possible to protect the tank 60 effectively.

In the above embodiment, the spring 84 allows the band 80 to deform in accordance with expansion or contraction of the tank 60. However, the disclosure is not limited to this, and other elastic body such as rubber may be used instead of the spring 84, and the band 80 itself may be made from an elastic material such as resin.

In the foregoing embodiment, each of the bands 80 and the center member 95 of the tank protector 90 are fixed to each other by the bolts 92, 93. However, the disclosure is not limited to this, and the bands 80 and the end portion members 96 of the tank protector 90 may be fixed by bolts, respectively. Thus, since the end portion members 96 are thicker than the center member 95, the tank protector 90 is fixed to the bands 80 more reliably.

The disclosure is not limited to the embodiments, and can be carried out in various configurations without departing from the gist of the disclosure. For example, the technical characteristics in the embodiments corresponding to the technical characteristics in the respective aspects described in Summary may be replaced or combined as appropriate in order to achieve a part of or all of the effects. Unless the technical characteristics are described as essential in the specification, such technical characteristics may be deleted as appropriate.

What is claimed is:

1. A tank mounting structure comprising:
   a member that fixes a tank;
   a band configured to fix the tank in a state where the band sandwiches the tank with the member and wherein the band deforms in accordance with expansion or contraction of the tank; and
   a tank protector configured to be fixed to an outer side of the band.

2. The tank mounting structure according to claim 1, wherein
   the tank protector includes a center member and end portion members, the center member being provided on an outer side of a cylinder portion that is a cylindrical portion of the tank, and the end portion members being provided on outer sides of dome portions, respectively, the dome portions being on both end sides of the cylinder portion of the tank, respectively; and
   the end portion members are thicker than the center member.

3. The tank mounting structure according to claim 2, wherein a lower end of each of the end portion members of the tank protector is positioned lower than a lower end of the center member of the tank protector.

4. The tank mounting structure according to claim 1, wherein shear strength of the tank protector is greater than shear strength of the band.

5. The tank mounting structure according to claim 1, wherein the tank mounting structure is configured such that an end portion of the band is fixed to the frame while applying pressing force to the tank by using an elastic body.

6. The tank mounting structure according to claim 1, wherein the band is made from metal.

7. The tank mounting structure according to claim 1, wherein the band is made from an elastic resin material.

8. A vehicle comprising the tank mounting structure according to claim 1.

* * * * *